(12) United States Patent
Qin et al.

(10) Patent No.: US 11,907,405 B2
(45) Date of Patent: Feb. 20, 2024

(54) SECURE DATA STORAGE DEVICE ACCESS CONTROL AND SHARING

(71) Applicant: International Business Machines Corporation, Armonk, NY (US)

(72) Inventors: Xiaohan Qin, Austin, TX (US); Pedro V. Torres, Travis, TX (US); Xinya Wang, Austin, TX (US); Amit Agarwal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 17/070,565

(22) Filed: Oct. 14, 2020

(65) Prior Publication Data

US 2022/0114271 A1 Apr. 14, 2022

(51) Int. Cl.
*G06F 3/00* (2006.01)
*G06F 21/62* (2013.01)
*G06F 9/54* (2006.01)

(52) U.S. Cl.
CPC .............. *G06F 21/629* (2013.01); *G06F 9/54* (2013.01); *G06F 21/6218* (2013.01)

(58) Field of Classification Search
CPC ....................................................... G06F 9/54
USPC ......................................................... 719/328
See application file for complete search history.

(56) References Cited

U.S. PATENT DOCUMENTS

| | | | |
|---|---|---|---|
| 5,161,189 A | 11/1992 | Bray et al. | |
| 5,699,428 A * | 12/1997 | McDonnal | G06F 21/602 |
| | | | 713/193 |
| 5,737,523 A * | 4/1998 | Callaghan | G06F 21/6236 |
| | | | 709/225 |
| 6,185,678 B1 | 2/2001 | Arbaugh et al. | |
| 6,195,710 B1 * | 2/2001 | Borgendale | G06F 9/5022 |
| | | | 719/319 |
| 7,591,015 B2 | 9/2009 | Cargille et al. | |
| 8,032,898 B2 | 10/2011 | Hunt et al. | |
| 8,327,327 B2 | 12/2012 | Bierhoff et al. | |
| 8,429,191 B2 | 4/2013 | Desai et al. | |
| 9,953,182 B2 | 4/2018 | Agarwal et al. | |
| 10,176,078 B1 * | 1/2019 | Motel | G06F 11/3447 |

(Continued)

FOREIGN PATENT DOCUMENTS

| | | |
|---|---|---|
| CN | 107038369 A | 8/2017 |
| KP | 20170086926 A * | 7/2017 |
| WO | 2011042892 A1 | 4/2011 |

OTHER PUBLICATIONS

Lap Chung Lam, A General Dynamic Information Flow Tracking Framework for Security Applications. (Year: 2006).*

(Continued)

*Primary Examiner* — Lechi Truong
(74) *Attorney, Agent, or Firm* — Garg Law Firm, PLLC; Rakesh Garg; Nathan Rau

(57) ABSTRACT

A return address of a caller of a software function within an access control component is determined, the caller comprising a software component seeking access to a protected resource protected by the access control component. From the return address, a filename of the caller is determined. Responsive to determining that the filename is included in a set of filenames of components allowed to access the protected resource, the caller is allowed to access the protected resource.

20 Claims, 8 Drawing Sheets

(56) References Cited

U.S. PATENT DOCUMENTS

| | | | |
|---|---|---|---|
| 2005/0234956 A1 | 10/2005 | Hoennig | |
| 2006/0059252 A1* | 3/2006 | Tatsubori | G06F 21/6218 709/226 |
| 2006/0136890 A1* | 6/2006 | Jodh | G06F 9/44521 717/163 |
| 2014/0195571 A1* | 7/2014 | Wang | G06F 3/068 707/823 |
| 2015/0033112 A1* | 1/2015 | Norwood | G06F 16/958 715/230 |
| 2016/0246510 A1* | 8/2016 | Rothman | G06F 21/575 |
| 2019/0227829 A1* | 7/2019 | Schnee | G06F 9/5077 |

OTHER PUBLICATIONS

Vassilis Prevelakis, Decentralized Access Control in Distributed File Systems. (Year: 2008).*

Alan A. Jorgensen, An API Testing Method. (Year: 2000).*

Joseph Bester, Gass: A Data Movement and Access Service for Wide Area Computing Systems . (Year: 1999).*

Xu et al. "Towards a VMM-based Usage Control Framework for OS Kernel Integrity Protection", SACMAT'07, Jun. 20-22, 2007, Sophia Antipolis, France. 2007.

Edwards et al., Runtime verification of authorization hook placement for the Linux security modules framework, Proceedings of the 9th ACM Conference on Computer and Communications Security, 2002.

Watson et al., "The TrustedBSD MAC Framework: Extensible Kernel Access Control for FreeBSD 5.0", FREENIX Track: 2003 USENIX Annual Technical Conference.

International Searching Authority, PCT/CN2021/114057, dated Nov. 26, 2021.

* cited by examiner

SECURE DATA STORAGE DEVICE ACCESS CONTROL AND SHARING

BACKGROUND

The present invention relates generally to a method, system, and computer program product for device access control. More particularly, the present invention relates to a method, system, and computer program product for secure data storage device access control and sharing.

An operating system kernel serves as an interface between the hardware components of a computer system, such as main memory and a processor, and applications executing on the system. A device driver, also called a kernel extension, is a computer program that provides a software interface to a hardware device within a computer system, enabling other software components (such as a kernel and user-level applications) to access the device without themselves being device-specific. Software components often communicate with each other via an Application Program Interface (API), which defines the kinds of calls or requests that can be made from one component to another, how to make them, the data formats that should be used, and the conventions to follow when calling.

A virtual machine is an emulation of a physical computer system. Multiple operating system kernels can each execute in their own virtual machine on one physical system.

A secure data storage device is a data storage device that encrypts data stored on the device and allows access to stored data only to software authorized to access that particular data. A secure data storage device is also sharable, storing data for more than one user. When a secure data storage device is shared, an access control implementation for the device must also ensure that one device user's data is not accessible to another device user.

One implementation of a secure data storage device uses a portion of physical non-volatile memory allocated to each virtual machine executing on a system to store a small amount (e.g. four kilobytes) of secret data or encryption key materials. The implementation includes firmware secure storage device APIs by which an operating system can query the presence and the size of the device, to lock device access via a key or password, and to read data from and write data to the device using a previously set password. During kernel boot-up, the kernel locks the shared storage device with a password, and other software components (device drivers or kernel extensions) that intend to use the device must do so via kernel secure storage device APIs. The implementation is sharable, storing data for more than one device driver or kernel extension.

SUMMARY

The illustrative embodiments provide a method, system, and computer program product. An embodiment includes a method that determines a return address of a caller of a software function within an access control component, the caller comprising a software component seeking access to a protected resource protected by the access control component. An embodiment determines, from the return address, a filename of the caller. An embodiment allows, responsive to determining that the filename is included in a set of filenames of components allowed to access the protected resource, the caller to access the protected resource.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
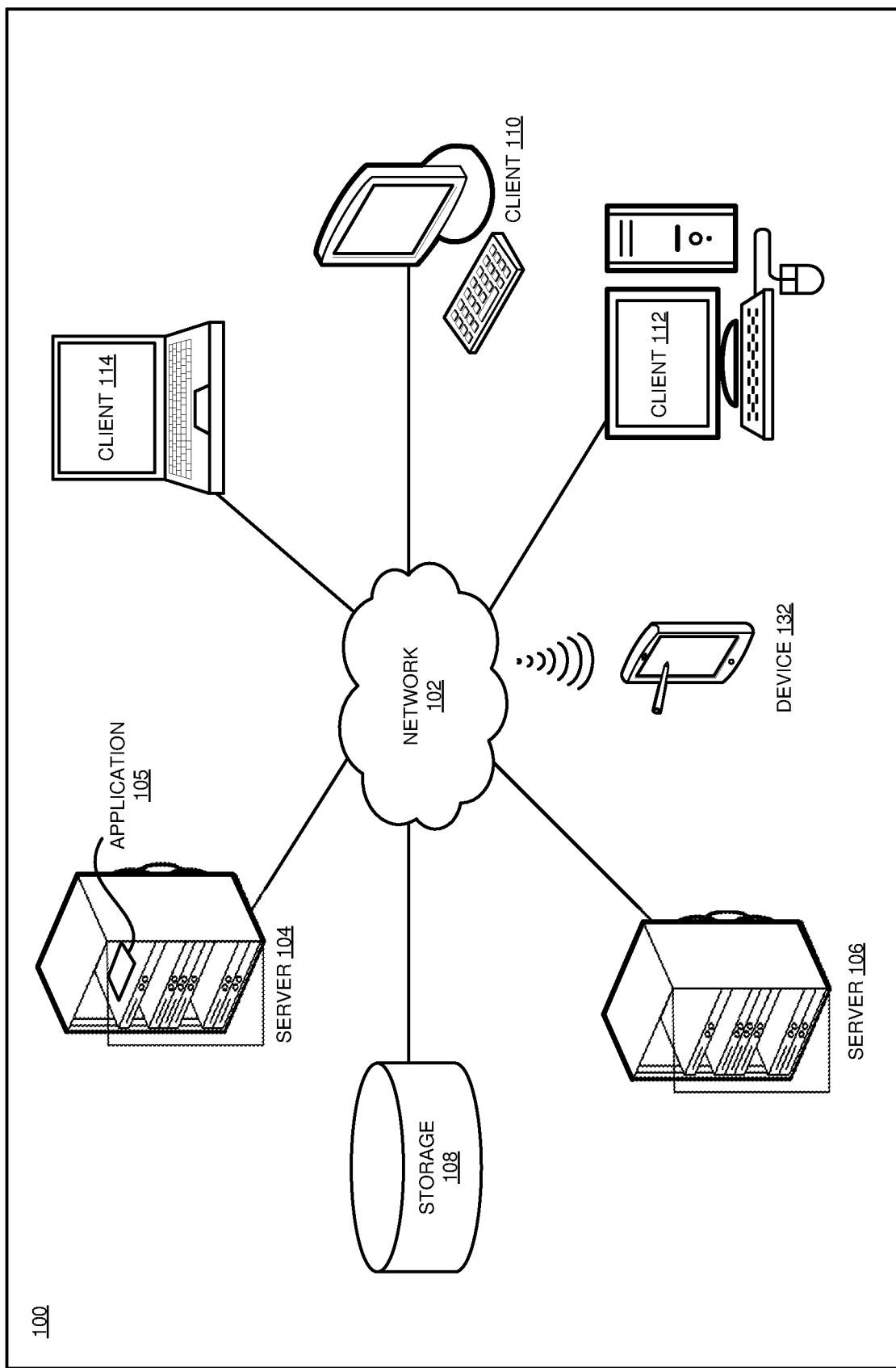
FIG. 1 depicts a block diagram of a network of data processing systems in which illustrative embodiments may be implemented.

The illustrative embodiments recognize that access control methods that rely on encrypting data in transit and in storage, in which only an authorized user possesses a key with which to encrypt or decrypt the data, are not effective for a storage device that itself is designed to store keys. Such a system would have to store keys to the key storage device in another location, simply moving the problem without solving it.

The illustrative embodiments also recognize that, when a secure data storage device is shared, one device user's data must not accessible to another device user. Here, again, encrypting or decrypting different users' data with different keys is not effective for a storage device that itself is designed to store keys. In addition, when implementations rely on memory being accessible only to a key holder, an unauthorized user could add another user's key to its own keyset and thus have the ability to access the other user's memory. Thus, illustrative embodiments recognize that there is an unmet need for an access control solution for a shared secure data storage device that does not use possession of encryption or decryption keys to denote an authorized user.

The illustrative embodiments recognize that the presently available tools or solutions do not address these needs or provide adequate solutions for these needs. The illustrative embodiments used to describe the invention generally address and solve the above-described problems and other problems related to secure data storage device access control and sharing.

An embodiment can be implemented as a software application. The application implementing an embodiment can be configured as a modification of an existing device access control system, as a separate application that operates in conjunction with an existing device access control system, a standalone application, or some combination thereof.

Particularly, some illustrative embodiments provide a method that determines a return address of a caller of a software function within an access control component. The caller is a software component seeking access to a protected resource protected by the access control component. The method determines, from the return address, a filename of the caller. Then, if the filename is included in a set of filenames of components allowed to access the protected resource, the method allows the caller to access the protected resource.

An embodiment receives a request to access a protected resource. One non-limiting example of a protected resource is a secure data storage device storing data for one or more applications or other software components. Other types of protected resource are also possible and contemplated within the scope of the illustrative embodiments. An access control component implemented in software controls access to the protected resource, and a request to access a protected resource comes in the form of a call to a software function within the access control component. In one embodiment, the access control component is part of an operating system kernel, and the request to access a protected resource comes from a kernel extension or device driver. Other implementations of the access control component and other sources of the request to access a protected resource are also possible and contemplated within the scope of the illustrative embodiments.

An embodiment determines a return address of the caller of the software function within the access control component. The return address of the caller is the execution address at which execution will continue once the software function has completed execution. In an environment in which function return addresses are stored in a stack frame, one embodiment determines the direct caller using the most recently stored return address. Another embodiment determines the caller stack by following the return address chain within the stack frame.

An embodiment determines a filename or other identifier of the caller from the caller's return address. One embodiment determines the identifier using a kernel function that takes an address as input and returns an identifier for the code executing at the input address. For example, the Linux operating system includes a kernel function called _builtin_ return_address(0) which returns an identifier of the immediate caller. Changing the argument to 1 returns an identifier of the caller of the caller, and so on. Other operating systems include a similar capability.

An embodiment maintains a safelist of filenames of modules that are authorized to access the protected resource. In one embodiment, contents of the safelist are set during initial system installation or configuration and not changeable thereafter, to prevent a bad actor from adding an additional module filename to the safelist. In another embodiment, contents of the safelist are modifiable, but only by a trusted user, by a user in possession of an encryption key, or using another secure method or combination of methods. One embodiment maintains contents of the safelist within the protected resource itself. Thus, if the calling module matches a filename named in the safelist, an embodiment allows the caller to access the protected resource. If the calling module does not match a filename named in the safelist, an embodiment prevents the caller from accessing the protected resource.

One embodiment also stores one or more digital signatures, each associated with a module in the safelist. In this embodiment, if the calling module matches a filename named in the safelist, the embodiment computes a cryptographic hash of the calling module. If the hash matches the value decrypted from the stored digital signature, the embodiment allows the caller to access the protected resource. If the two signatures do not match, the embodiment prevents the caller from accessing the protected resource. Digital signature verification prevents a bad actor from accessing the protected resource by tampering with a trusted component, or replacing a trusted component with a new one.

If the protected resource is shared among more than one calling module, an embodiment assigns a unique tag to each calling module. When a calling module writes data to the resource, an embodiment concatenates that module's tag with the object label supplied by the caller into a full label, and stores the data, labelled with the full label, in the resource. Similarly, when a calling module reads data from the resource, an embodiment concatenates that module's tag with the object label supplied by the caller into a full label, retrieves the requested data using the full label, and supplies the data to the caller. Another embodiment combines a module-specific tag with an object label supplied by a caller using a method other than concatenation. Thus, a calling module can only retrieve its own data, and not the data of other modules. In addition, module-specific tags resolve labelling conflicts that could be caused by two modules using the same label.

The manner of secure data storage device access control and sharing described herein is unavailable in the presently available methods in the technological field of endeavor pertaining to device access control mechanisms. A method of an embodiment described herein, when implemented to execute on a device or data processing system, comprises substantial advancement of the functionality of that device or data processing system in determines a return address of a caller of a software function within an access control component, determining a filename of the caller from the return address, and, if the filename is included in a set of filenames of components allowed to access the protected resource, the method allows the caller to access the protected resource.

The illustrative embodiments are described with respect to certain types of protected resources, secure data storage devices, modules, operating system and operating system kernel implementations, device drivers, kernel extensions, component callers, safelists, tags, digital signatures, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
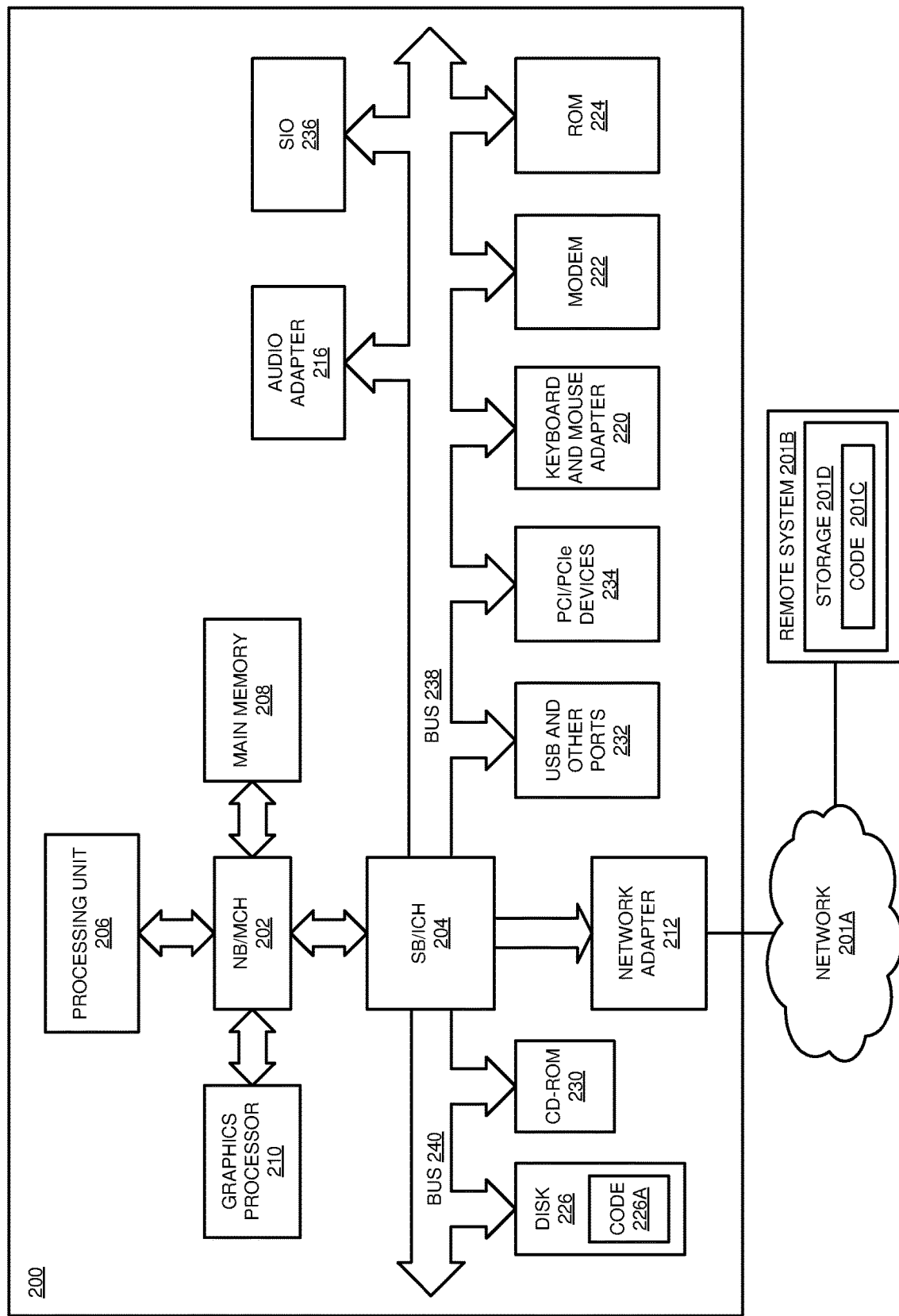
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
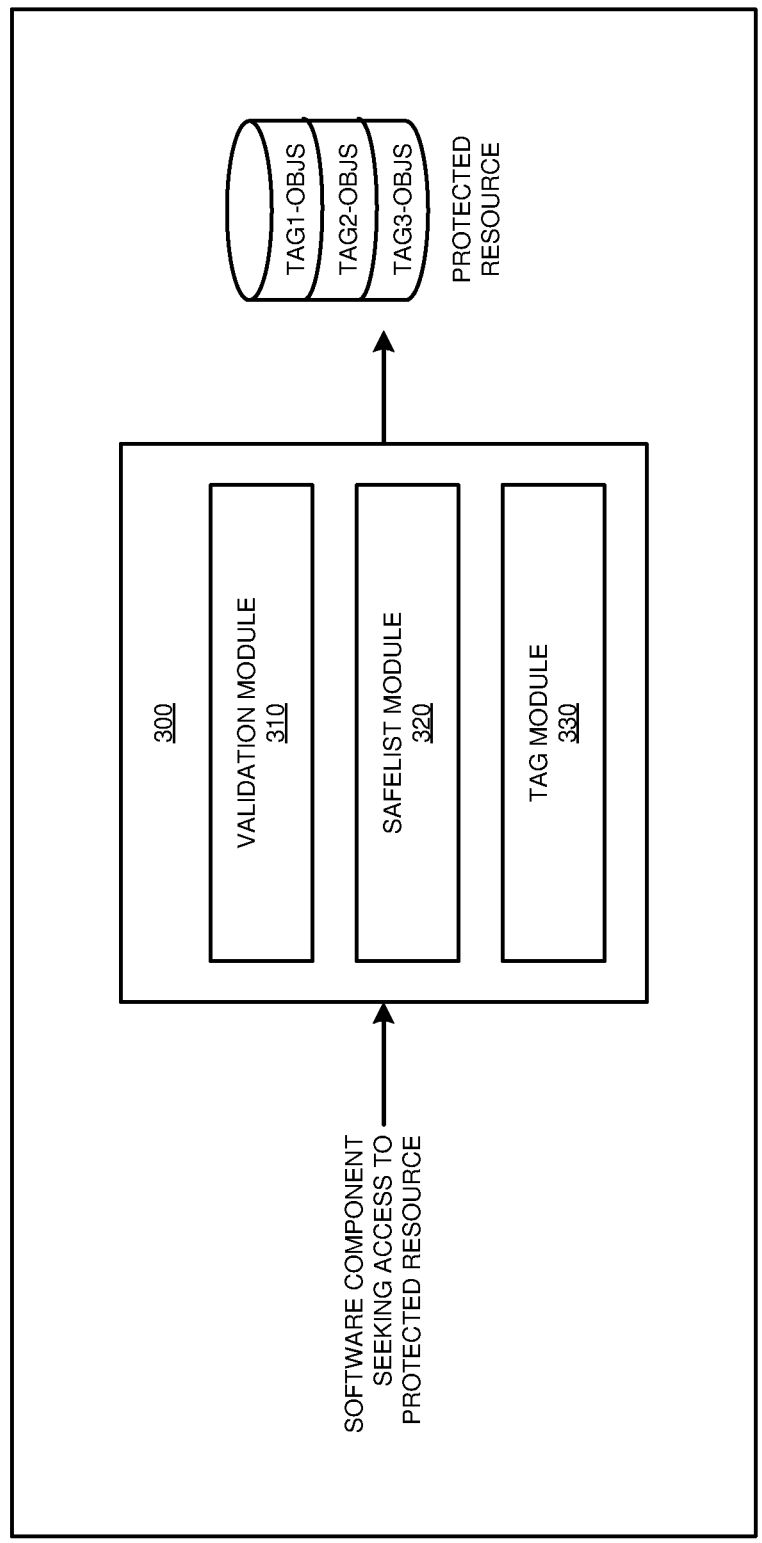
FIG. 3 depicts a block diagram of an example configuration for secure data storage device access control and sharing in accordance with an illustrative embodiment.

With reference to FIG. 3, this figure depicts a block diagram of an example configuration for secure data storage device access control and sharing in accordance with an illustrative embodiment. Application 300 is an example of application 105 in FIG. 1 and executes in any of servers 104 and 106, clients 110, 112, and 114, and device 132 in FIG. 1.

Application 300 receives a request to access a protected resource. In one implementation of application 300, the protected resource is a secure data storage device, storing data for one or more applications or other software components. An access control component implemented in software controls access to the protected resource, and a request to access a protected resource comes in the form of a call to a software function within the access control component. In one implementation of application 300, the access control component is part of an operating system kernel, and the request to access a protected resource comes from a kernel extension or device driver.

Validation module 310 determines the caller of the software function based on the function return address within the access control component. In an environment in which function return addresses are stored in a stack frame, one implementation of module 310 determines the direct caller using the most recently stored return address. Another implementation of module 310 determines the caller stack by following the return address chain within the stack frame.

Module 310 also determines a filename or other identifier of the caller from the caller's return address. One implementation of module 310 determines the filename using a kernel function that takes an address as input and returns a filename for the code executing at the input address.

Safelist module 320 maintains a safelist of filenames of modules that are authorized to access the protected resource. In one implementation of module 320, contents of the safelist are set during initial system installation or configuration and not changeable thereafter, to prevent a bad actor from adding an additional module to the safelist. In another implementation of module 320, contents of the safelist are modifiable, but only by a trusted user or using another secure method. Thus, if the calling module matches a filename named in the safelist, validation module 310 allows the caller to access the protected resource. If the calling module does not match a filename named in the safelist, validation module 310 prevents the caller from accessing the protected resource.

One implementation of module 320 also stores one or more digital signatures, each associated with a module in the safelist. In this implementation, if the calling module matches a filename named in the safelist, module 320 computes a cryptographic hash of the calling module. If the hash matches the value decrypted from the stored digital signature, validation module 310 allows the caller to access the protected resource. If the two signatures do not match, module 310 prevents the caller from accessing the protected resource. Computing and checking a module's cryptographic hash against a stored signature prevents a bad actor from accessing the protected resource by tampering with a trusted component, or replacing a trusted component with a new one.

If the protected resource is shared among more than one calling module, tag module 330 assigns a unique tag to each calling module. When a calling module writes data to the resource, module 330 concatenates that module's tag with the object label supplied by the caller into a full label, and stores the data, labelled with the full label, in the resource. Similarly, when a calling module reads data from the resource, module 330 concatenates that module's tag with the object label supplied by the caller into a full label, retrieves the requested data using the full label, and supplies the data to the caller. Thus, a calling module can only retrieve its own data, and not the data of other modules. In addition, module-specific tags resolve labelling conflicts that could be caused by two modules using the same label.

Figure 4:
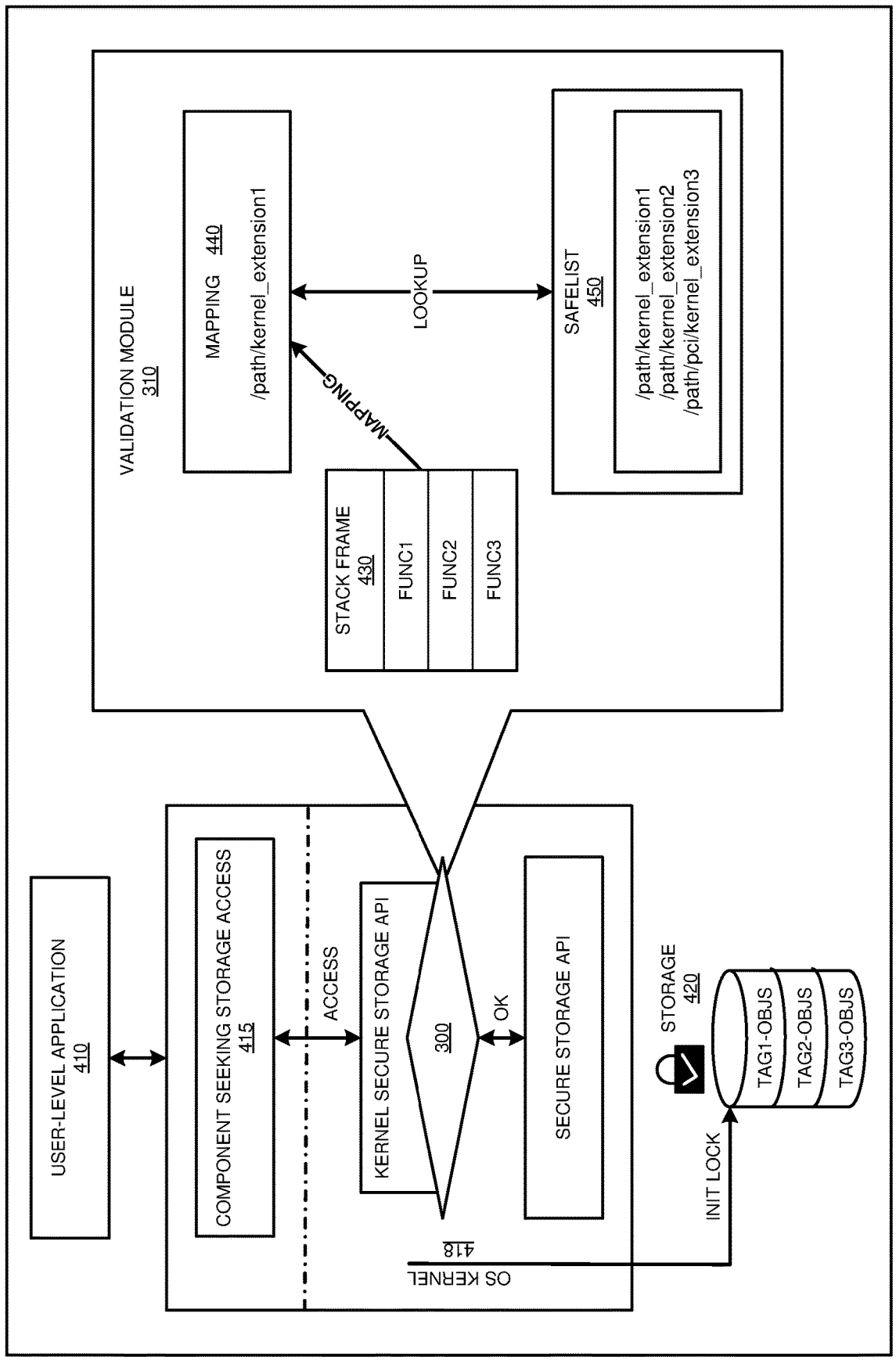
FIG. 4 depicts an example of secure data storage device access control and sharing in accordance with an illustrative embodiment.

With reference to FIG. 4, this figure depicts an example of secure data storage device access control and sharing in accordance with an illustrative embodiment. The example can be executed using application 300 in FIG. 3. Application 300 and validation module 310 are the same as application 300 and validation module 310 in FIG. 3.

As depicted, user-level application 410 is an application using secure data storage 420, a protected resource, via operating system (OS) kernel 418. Component 415 is a component seeking secure data storage access on behalf of application 410. Component 415 is a device driver or kernel extension. Application 300 is implemented within an access control component, which controls access to secure data storage 420. During kernel boot-up, OS kernel 418 locked access to secure data storage 420 by setting a key or password for all future device accesses, indicated by the lock symbol and checkmark.

A request to access a protected resource comes in the form of a call, using a kernel secure storage API, from component 415 to a software function within the access control component. Application 300 determines whether or not to allow the access.

In particular, validation module 310 determines a return address of the caller of the software function within the access control component. In this example environment, function return addresses are stored in stack frame 430, and module 310 determines the return address by obtaining some or all of the data within stack frame 430, and using the most recently stored address as the return address. Module 310 determines a filename or other identifier of the caller from the caller's return address, by using a kernel function that takes an address as input and returns a filename for the code executing at the input address. Here, the return address maps to mapping 440, indicating that the filename is /path/kernel_extension1. Module 310 determines whether mapping 440 matches a filename in safelist 450. If so (as depicted), module 310 allows component 415 to access secure data storage 420. If not, module 310 prevents component 415 from accessing secure data storage 420.

Figure 5:
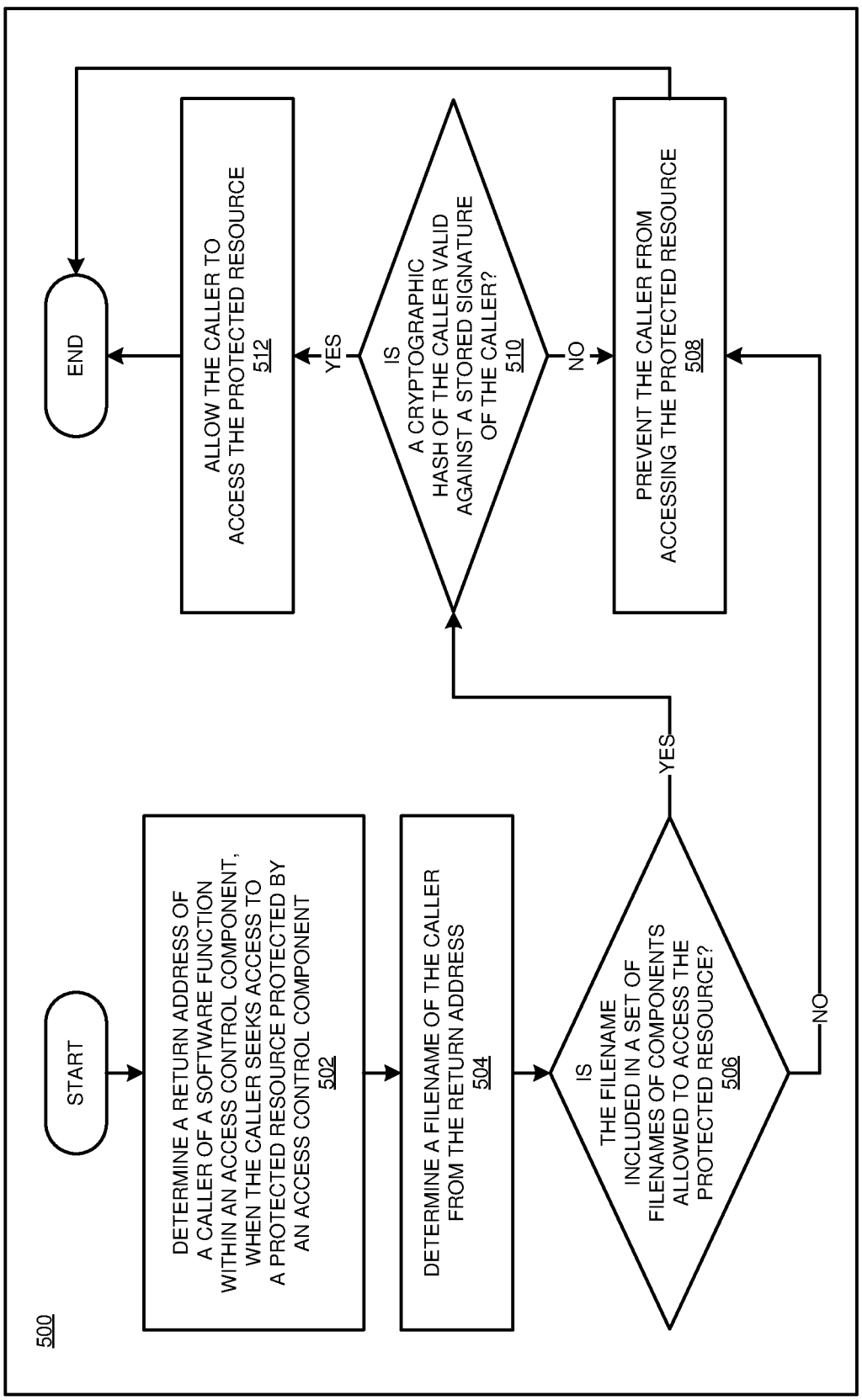
FIG. 5 depicts a flowchart of an example process for secure data storage device access control and sharing in accordance with an illustrative embodiment.

With reference to FIG. 5, this figure depicts a flowchart of an example process for secure data storage device access control and sharing in accordance with an illustrative embodiment. Process 500 can be implemented in application 300 in FIG. 3.

In block 502, the application determines a return address of a caller seeking access to a protected resource protected by an access control component of a software function within the access control component. In block 504, the application determines a filename of the caller from the return address. In block 506, the application determines whether the filename is included in a set of filenames of components allowed to access the protected resource. If yes ("YES" path of block 506), in block 510, in an optional step, the application determines whether or not a cryptographic hash of the caller is valid against a stored signature of the caller. If yes ("YES" path of block 510), in block 512 the application allows the caller to access the protected resource. Otherwise ("NO" paths of blocks 506 and 510), in block 508 the application prevents the caller from accessing the protected resource. Then the application ends.

Figure 6:
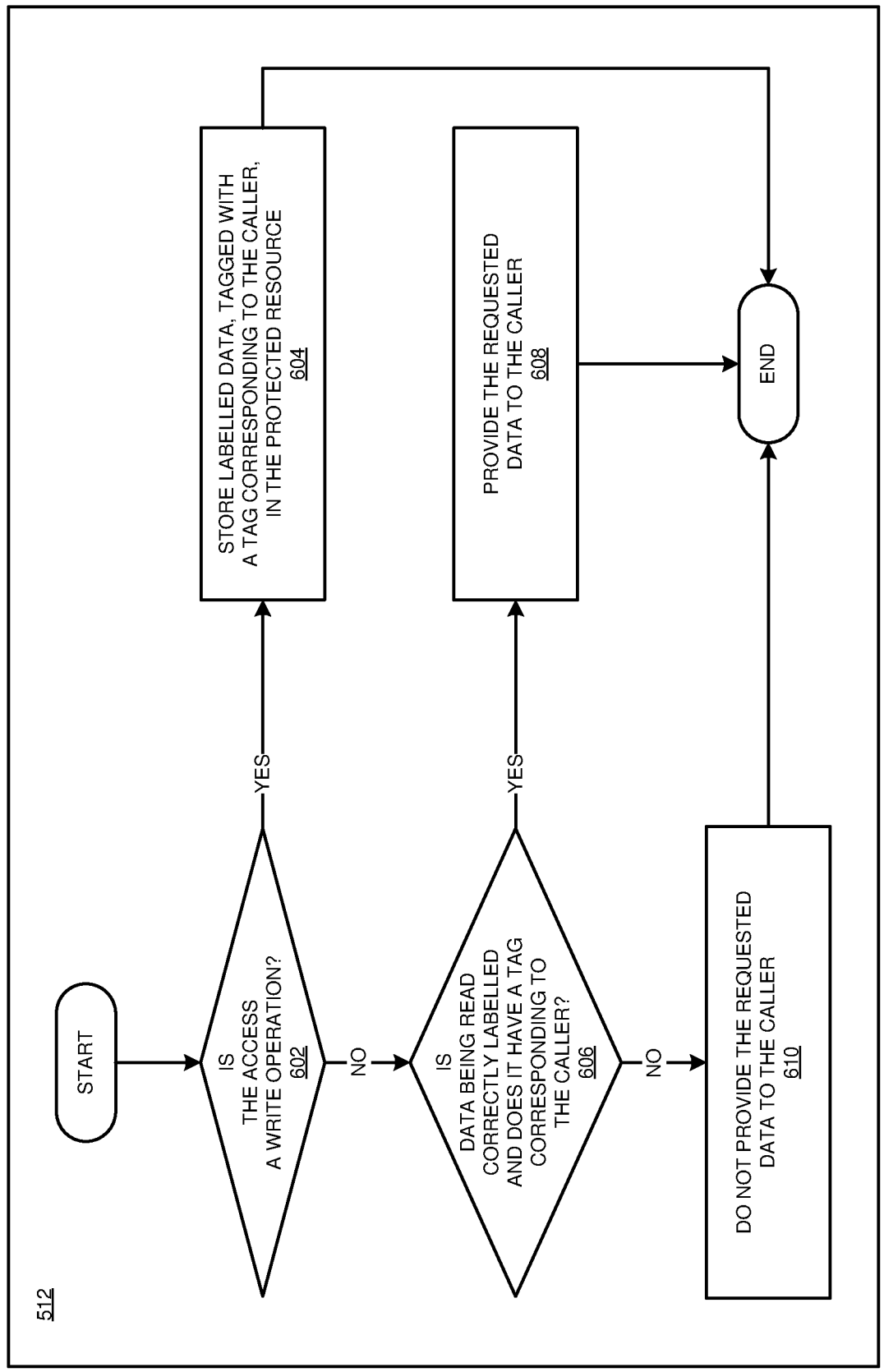
FIG. 6 depicts a flowchart of an example process for secure data storage device access control and sharing in accordance with an illustrative embodiment.

With reference to FIG. 6, this figure depicts a flowchart of an example process for secure data storage device access control and sharing in accordance with an illustrative embodiment. In particular, FIG. 6 provides more detail of block 512 in FIG. 5.

In block 602, the application determines whether the access is a write operation. If so ("YES" path of block 602), in block 604 the application stores labelled data, tagged with a tag corresponding to the caller, in the protected resource. If not ("NO" path of block 602), the access is a read operation. Thus, in block 606, the application determines whether the data being read is correctly labelled and has a tag corresponding to the caller. If so ("YES" path of block 606), in block 608 the application provides the requested data to the caller. If not ("NO" path of block 606), in block 610 the application does not provide the requested data to the caller. Then the application ends.

Figure 7:
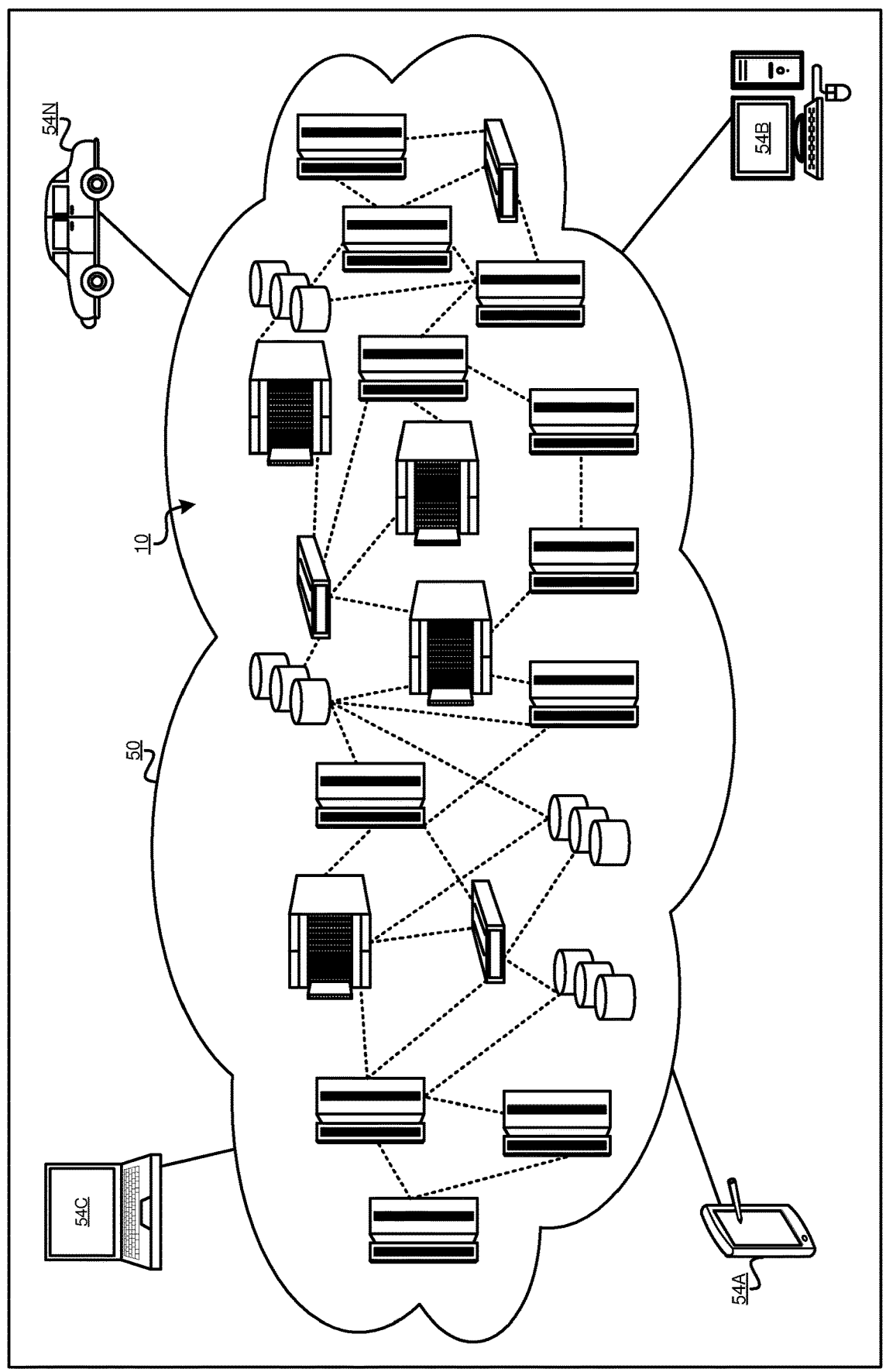
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
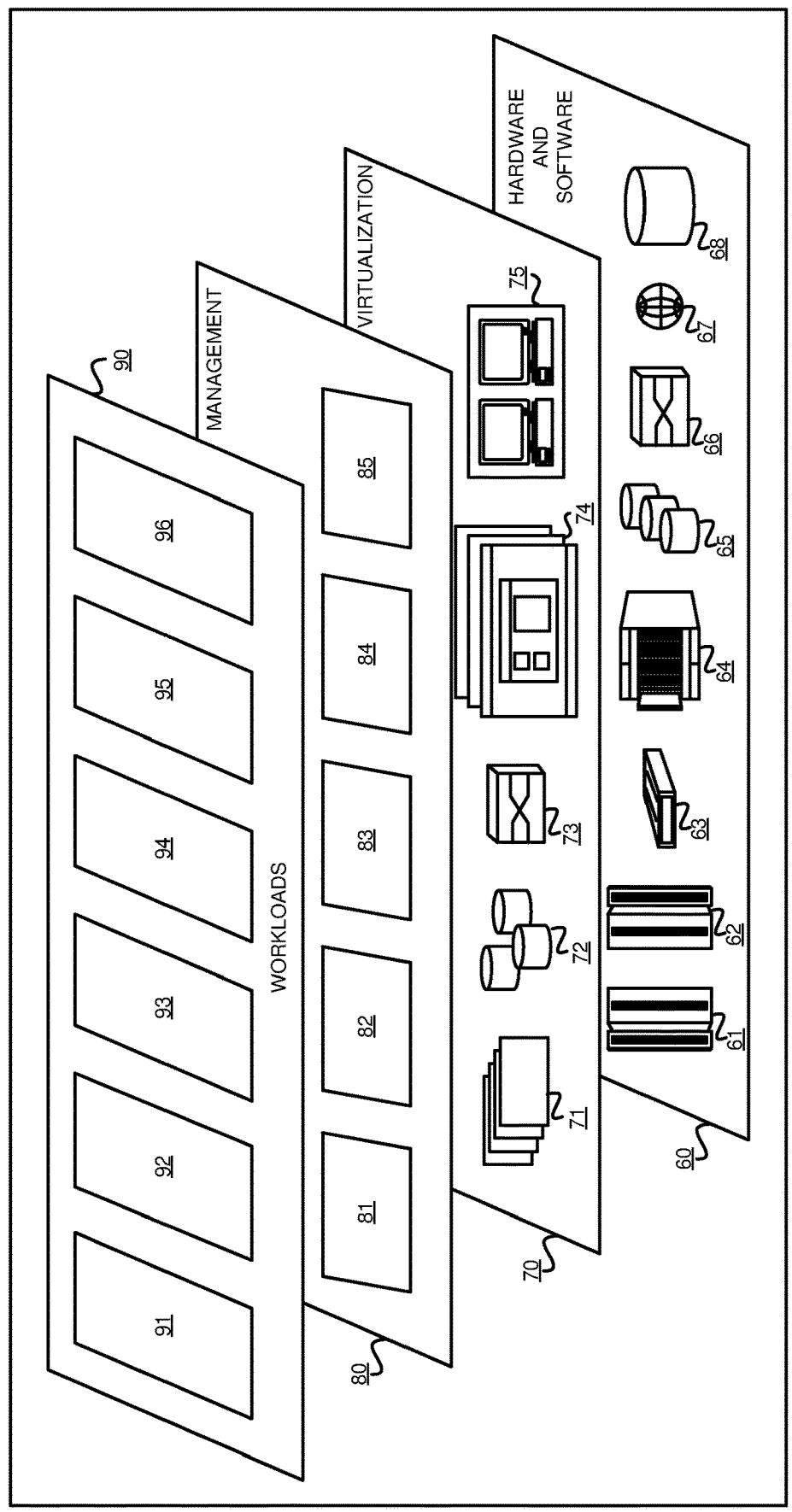
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for secure data storage device access control and sharing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    determining a return address of a caller of a software function within an access control component, the caller comprising a software component seeking access to a protected resource protected by the access control component;
    determining, from the return address, a filename of the caller using a kernel function, the kernel function being configured to take the return address as input and return the filename if the caller executes code at the return address; and
    allowing, responsive to determining that the filename is included in a set of filenames of components allowed to access the protected resource, the caller to access the protected resource, wherein the set of filenames of components allowed to access the protected resource is stored within the protected resource, and
    wherein the allowing is based on a comparison of a label, formed by combining a calling module tag with an object label supplied by the caller, to a plurality of labels stored within the protected resource.

2. The computer-implemented method of claim 1, further comprising:
    preventing, responsive to determining that the filename is not included in the set of filenames of components allowed to access the protected resource, the caller from accessing the protected resource.

3. The computer-implemented method of claim 1, further comprising:
    storing a plurality of digital signatures, a digital signature in the plurality of digital signatures being associated with at least one software component in a safelist, wherein the allowing is performed responsive to determining that a stored digital signature previously computed for the software component is valid.

4. The computer-implemented method of claim 1, further comprising:
    storing, responsive to the allowing, a first portion of data in the protected resource, the storing including tagging the first portion of data with a tag corresponding to the caller.

5. The computer-implemented method of claim 4, further comprising:
    determining, responsive to the allowing, that a second portion of data in the protected resource is tagged with a second tag corresponding to the caller; and
    providing, responsive to the determining, the second portion of data to the caller.

6. The computer-implemented method of claim 4, further comprising:
determining, responsive to the allowing, that a second portion of data in the protected resource is tagged with a second tag that does not corresponding to the caller; and
preventing, responsive to the determining, the second portion of data from being provided to the caller.

7. A computer program product for secure data storage device access control and sharing, the computer program product comprising:
one or more computer readable storage media, and program instructions collectively stored on the one or more computer readable storage media, the program instructions comprising:
program instructions to determine a return address of a caller of a software function within an access control component, the caller comprising a software component seeking access to a protected resource protected by the access control component;
program instructions to determine, from the return address, a filename of the caller using a kernel function, the kernel function being configured to take the return address as input and return the filename if the caller executes code at the return address; and
program instructions to allow, responsive to determining that the filename is included in a set of filenames of components allowed to access the protected resource, the caller to access the protected resource, wherein the set of filenames of components allowed to access the protected resource is stored within the protected resource and
wherein the allowing is based on a comparison of a label, formed by combining a calling module tag with an object label supplied by the caller, to a plurality of labels stored within the protected resource.

8. The computer program product of claim 7, further comprising:
program instructions to prevent, responsive to determining that the filename is not included in the set of filenames of components allowed to access the protected resource, the caller from accessing the protected resource.

9. The computer program product of claim 7, further comprising:
storing a plurality of digital signatures, a digital signature in the plurality of digital signatures being associated with at least one software component in a safelist, wherein the allowing is performed responsive to determining that a stored digital signature previously computed for the software component is valid.

10. The computer program product of claim 7, further comprising:
program instructions to store, responsive to the allowing, a first portion of data in the protected resource, the storing including tagging the first portion of data with a tag corresponding to the caller.

11. The computer program product of claim 10, further comprising:
program instructions to determine, responsive to the allowing, that a second portion of data in the protected resource is tagged with a second tag corresponding to the caller; and
program instructions to provide, responsive to the determining, the second portion of data to the caller.

12. The computer program product of claim 10, further comprising:
program instructions to determine, responsive to the allowing, that a second portion of data in the protected resource is tagged with a second tag that does not corresponding to the caller; and
program instructions to prevent, responsive to the determining, the second portion of data from being provided to the caller.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to determine a return address of a caller of a software function within an access control component, the caller comprising a software component seeking access to a protected resource protected by the access control component;
program instructions to determine, from the return address, a filename of the caller using a kernel function, the kernel function being configured to take the return address as input and return the filename if the caller executes code at the return address; and
program instructions to allow, responsive to determining that the filename is included in a set of filenames of components allowed to access the protected resource, the caller to access the protected resource, wherein the set of filenames of components allowed to access the protected resource is stored within the protected resource and
wherein the allowing is based on a comparison of a label, formed by combining a calling module tag with an object label supplied by the caller, to a plurality of labels stored within the protected resource.

17. The computer system of claim 16, further comprising:
program instructions to prevent, responsive to determining that the filename is not included in the set of filenames of components allowed to access the protected resource, the caller from accessing the protected resource.

18. The computer system of claim 16, further comprising:
storing a plurality of digital signatures, a digital signature in the plurality of digital signatures being associated with at least one software component in a safelist, wherein the allowing is performed responsive to determining that a stored digital signature previously computed for the software component is valid.

19. The computer system of claim 16, further comprising:
program instructions to store, responsive to the allowing, a first portion of data in the protected resource, the storing including tagging the first portion of data with a tag corresponding to the caller.

20. The computer system of claim 19, further comprising:

program instructions to determine, responsive to the allowing, that a second portion of data in the protected resource is tagged with a second tag corresponding to the caller; and program instructions to provide, responsive to the determining, the second portion of data to the caller.

\* \* \* \* \*